Nov. 15, 1955  KICHITARO HAYASHIGUCHI  2,723,693
PROCESS FOR MAKING FINE BAMBOO-RODS FOR USE IN THE
MANUFACTURE OF BAMBOO-BLIND AND THE LIKE
Filed Nov. 9, 1954
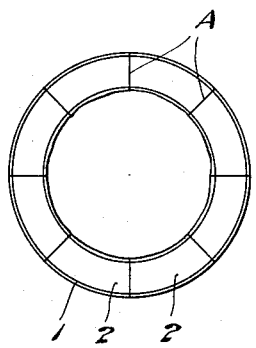
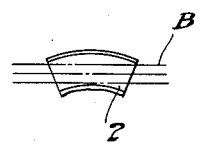
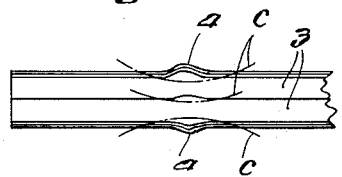
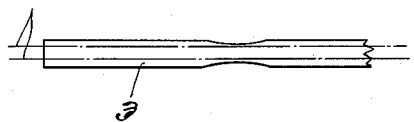
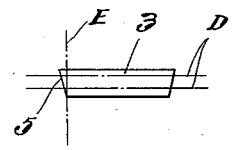
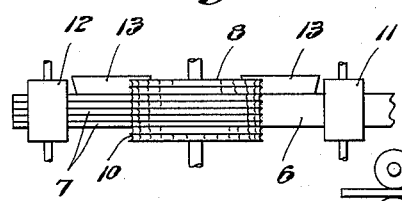
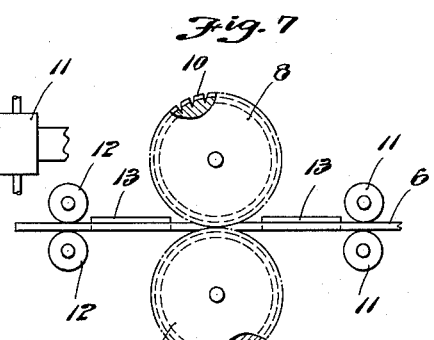
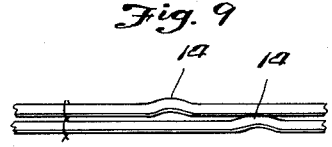
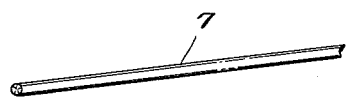
INVENTOR.
KICHITARO HAYASHIGUCHI
BY Mock + Blum
ATTORNEYS

United States Patent Office 2,723,693
Patented Nov. 15, 1955

2,723,693
PROCESS FOR MAKING FINE BAMBOO-RODS FOR USE IN THE MANUFACTURE OF BAMBOO-BLIND AND THE LIKE

Kichitaro Hayashiguchi, Tsu City, Japan

Application November 9, 1954, Serial No. 467,823

1 Claim. (Cl. 144—309)

This invention relates to a method of making fine bamboo-rods for use in the manufacture of the bamboo-blind and the like.

The bamboo has joints, due to which the known fine bamboo-rod made therefrom has an inclination to be crooked at the joint, and the finished fine bamboo-rod is of a crooked form.

The invention has therefore for its object to offer a means by which a fine bamboo-rod having no crooked form but being a straightened form may be prepared.

The invention is explained with reference to the accompanying drawings, of which Fig. 1 is an end view of a bamboo-pipe from which the fine bamboo-rod is to be made; Fig. 2 an end view of a bamboo-piece cut off from the bamboo-pipe shown in Fig. 1; Fig. 3 a side view of same; Fig. 4 a side view of a bamboo-plate cut from the piece shown in Figs. 2 and 3; Fig. 5 an end view of same; Fig. 6 a front view of a machine for splitting a real flat bamboo-plate into fine bamboo-rods; Fig. 7 a side view of same; Fig. 8 a general view of the fine bamboo-rod obtained by the invention; and Fig. 9 a side view of the fine bamboo-rods obtained by the known means.

According to the invention, in the first step the bamboo-pipe 1 is cut along the lines A, lengthwise and perpendicular to tangents of the wall of the pipe, as shown in Fig. 1, into several pieces 2, having a predetermined width as shown in Fig. 2.

In the second step, the bamboo-piece 2 is cut, along the chain line B, as shown in Fig. 2, into bamboo-plates 3 of a desired number, which is determined by the thickness of the bamboo-pipe.

In the third step, the bamboo-plate 3 is polished off at the joint 4, along the chain line C, removing thereby the joint at the surface up to a certain depth, and thus interrupting at this polished off portion the continuity of the fibres of the bamboo present at both sides of the joint. This is an important feature which is a key to make sure that a straightened form of the fine bamboo-rod is successfully obtained.

In the fourth step, the bamboo-plate 3 is cut off along the chain line D to form a real flat bamboo-plate, and at the same time the one inclined side 5 of same is cut along the chain line E to alter same into a perpendicular side.

In the fifth step, the real flat bamboo-plate 6 is passed through a machine as shown in Figs. 6 and 7 to be split into a number of the fine bamboo-rods 7. The machine consists, as shown, of a pair of upper and lower cutters 8 and 9, each provided with several cutting blades 10, of a circular or other desired form. The machine is further provided with feeding rollers 11 and the delivery rollers 12, and also with the guide pieces 13. The real flat plate 6 is fed by the feeding rollers 11, while being guided by the guide piece 13, to advance between the pair of the cutters 8 and 9, to be split into a member of the fine bamboo-rods 7, one of which is shown in Fig. 8. The guiding is obtained by sliding the perpendicular side of the real flat bamboo-plate along and contacting the guide piece 13.

The known bamboo-rod as shown in Fig. 9 is crooked at the joint portion 14, while the fine bamboo-rod of the invention as shown in Fig. 8 is of straightened form as shown.

The fine bamboo-rod of the invention is particularly useful for use in the manufacture of the bamboo-blind, because the bamboo-blind prepared from same does not present spaces between rods, such as found in the known bamboo-blind because of the presence of the crooked portions. The invention can thus offer a highest grade of bamboo-blind, which has long been sought.

The characteristic feature of the invention is the combination of the first to fifth steps set forth in the foregoing, which has been found satisfactory to obtain the straightened fine bamboo-rods of such form as desired, and which is considered to be novel in the art.

I claim:

A process for making fine bamboo-rods for use in the manufacture of bamboo-blind and the like, which comprises the first step wherein the bamboo-pipe is cut lengthwise and perpendicular to tangents of the wall of the pipe into several pieces, the second step wherein the piece is cut flatwise and lengthwise into bamboo-plates, the third step wherein the bamboo-plate is polished off at the joint to remove the surface portion of the joint to a certain depth, the fourth step wherein the bamboo-plate is cut off at its upper and lower surfaces to form a real flat bamboo-plate, and one inclined side is cut to form a perpendicular side, and finally the fifth step wherein the real flat bamboo-plate is passed, while being guided by the perpendicular side sliding along a guide piece, through a forming machine to be split into a number of the final fine bamboo-rods.

References Cited in the file of this patent

UNITED STATES PATENTS

| | | |
|---|---|---|
| 1,645,812 | Lane | Oct. 18, 1927 |
| 1,688,569 | Wensel | Oct. 23, 1928 |